United States Patent

Woolfson et al.

[11] 4,227,212
[45] Oct. 7, 1980

[54] ADAPTIVE UPDATING PROCESSOR FOR USE IN AN AREA CORRELATION VIDEO TRACKER

[75] Inventors: Martin G. Woolfson; Floyd C. Bentley, both of Baltimore, Md.

[73] Assignee: Westinghouse Electric Corp., Pittsburgh, Pa.

[21] Appl. No.: 944,523

[22] Filed: Sep. 21, 1978

[51] Int. Cl.² ............................................. H04N 7/18
[52] U.S. Cl. .............................. 358/126; 250/203 CT
[58] Field of Search ................................ 358/125, 126; 250/203 CT

[56] References Cited

U.S. PATENT DOCUMENTS

| | | | |
|---|---|---|---|
| 3,828,122 | 8/1974 | McPhee et al. | 250/203 CT |
| 3,829,614 | 8/1974 | Ahlbom et al. | 250/203 CT |
| 3,903,357 | 9/1975 | Woolfson et al. | 358/126 |
| 3,955,046 | 5/1976 | Ingham et al. | 358/126 |
| 4,133,004 | 1/1979 | Fitts | 358/126 |

Primary Examiner—Robert L. Griffin
Assistant Examiner—Joseph A. Orsino, Jr.
Attorney, Agent, or Firm—W. E. Zitelli

[57] ABSTRACT

In an area correlation video tracker, a reference subarray of picture elements acquired from a selected track window array of picture elements of an acquisition video frame is cross-correlated in accordance with a predetermined metric function with the picture elements of the selected track window array of each of a number of video frames generated subsequent the acquisition video frame. From these cross-correlations, a minimum cross-correlation value is derived and a subarray of picture elements associated therewith is identified in the track window array of the subsequently generated video frames. An adaptive threshold processor performs autocorrelations in accordance with the predetermined metric function with the video information of the acquisition frame to derive a reference threshold correlation value and with the video information of each of the number of subsequently generated frames to correspondingly derive another threshold correlation value each. An update condition is rendered in the video frame having a derived one cross-correlation value greater than the reference threshold correlation value. The update condition causes the values of the picture elements of the reference subarray to be replaced with the values of the picture elements of the identified subarray corresponding to the one cross-correlation value and causes the reference threshold correlation value to take on the value of the another threshold correlation value derived in the video frame associated with the one cross-correlation value, whereby subsequent cross-correlations will be performed with the updated values until another update condition is rendered.

16 Claims, 4 Drawing Figures

ADAPTIVE UPDATING PROCESSOR FOR USE IN AN AREA CORRELATION VIDEO TRACKER

BACKGROUND OF THE INVENTION

The present invention relates to the broad field of electro-optical systems which employ area correlation video trackers, and more particularly, to an adaptive reference threshold update processor for adaptively updating the intensity pattern of a reference array of pixels based on changing video scene conditions of said correlation video tracker.

Recently, the operational requirements imposed on electro-optical guidance assistance systems on-board single seat high performance aircraft, like fighters, for example, have been in a direction to minimize operator interface during acquisition and subsequent tracking of a target. Digital Area Correlation Trackers (DACT) have been used to reduce the pilot's attention and command inputs in accordance with prespecified goals of a "single seat" mission. In these DACT type systems, a visual display, such as a TV monitor, provides the field of view (FOV) scene sighted by an electro-optical sensor, such as a TV scanner, which is mounted on the aircraft. The line-of-sight positioning of the electro-optical sensor is normally controlled by position loops of a gimballed servo system as governed principally by one or more position error signals usually associated with azimuth and elevation. The FOV display is sectioned into at least two window areas by a set of cursors, for example, one window area generally referred to as the Track window and another window area known as the Reference window being of a smaller area than the Track window and positioned in the visual display within the Track window (refer to FIG. 1).

Figure 1:
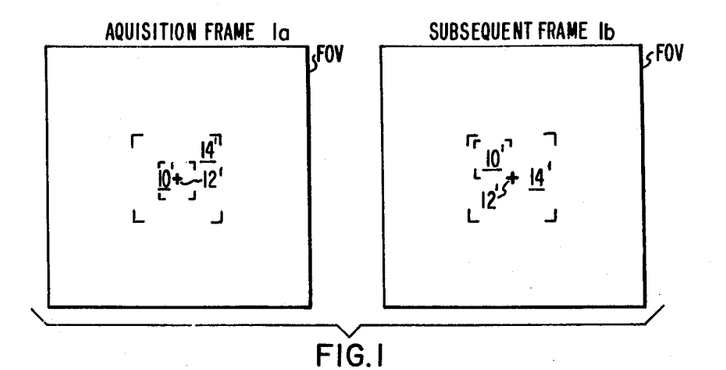
FIG. 1 is an illustration of the repositioning of a Reference window within a Track window between two typical video frame displays related to an area correlation video tracker.

In one embodiment of operation of a DACT system, a reference image representative of a predetermined target or selected portion thereof is provided in the Reference window of the display. The reference image comprises an array of digitized video picture elements known more commonly as pixels. The reference array of pixels represents a desired intensity or gray level pattern of the selected image for tracking purposes. At acquisition, the reference array of pixels which is defined by the geometric position of the Reference window within the Track window is extracted from the acquisition TV frame of video information and stored for cross-correlation purposes with video information of subsequent TV frames. FIG. 1 exemplifies the position of the Reference window 10' about the crosshairs 12' within the Track window 14' of the field of view (FOV) scene during an acquisition TV frame 1a.

The stored reference array acquired from the initial or acquisition TV frame is automatically correlated by the DACT with picture data within the Track window which is received in subsequent TV frames from the TV sensor. Each cross-correlation step is generally one of image matching where the area array reference of pixels, which may be a 16×16 array, for example, is image compared with each possible 16×16 array zone of pixels in the Track window of a subsequent TV picture frame in accordance with some known metric function. For example, suppose that the Track window pixel array area is 32×32 pixels, then there exist 289 possible 16×16 pixel array overlay image matching comparisons within the Track window of each TV frame subsequent the acquisition TV frame. As a result of the cross-correlation operation carried out for each subsequent TV frame of picture data, the Reference window is repositioned in the zone of the Track window which yields the best image match. An exemplary depiction of the Reference window 10' being repositioned in the Track window 14' in a subsequent TV picture frame 1b is shown in FIG. 1. In most DACT's, the relationship of the position of the best match reference image zone with respect to the position of the acquisition reference image zone provides a measure of the servo position tracking errors which are generally used to govern the gimbal servo system controlling the position of the electro-optical sensor to automatically track the selected target image.

At some time after acquisition, the reference array of pixels, in most cases, will no longer have the appearance characteristics of the selected target image as viewed by the TV camera because of practical conditions such as changing range of target, aircraft maneuvering, change in aspect angle and lighting, for example. If the new target patterns are permitted to change to the extent to cause loss of track, the operator's or pilot's attention may be further burdened by having to repeat an acquisition procedure with each loss of track occasion. In keeping with the goal of reducing the operator's attentiveness with respect to manually operating the DACT, it is of significant importance to automatically update the reference array of pixels at times during the tracking operation to prevent, for the most part, loss of track which is undesirable because it requires more pilot attention to repeat the acquisition procedure for each occasion thereof.

One known processor for updating the reference array during the tracking operation of the DACT employs one or more predetermined threshold values which represent reference array intensity pattern change limits for a set of known video conditions. For a more detailed description of such a system, reference is made to U.S. Pat. No. 3,955,046 issued to Ingham et al on May 4, 1976. In this type of processor, the intensity pattern of the reference array is correlated with the video information of the Track window for each subsequent frame to derive a measure of the change in the reference array intensity pattern with respect to time. The metric used to measure change in intensity pattern is usually some known image matching function. A selected measured change value for each TV frame is compared with one or more selected predetermined threshold values to determine in which TV frame to update the reference array of pixels. Generally, these types of systems are adequate if the changing video conditions are known for given target images and the intensity pattern of the video scenes is changing very slowly. However, when dealing with a high performance aircraft, like a fighter, for example, which may at times perform such maneuvers as dives, turns, loops, jinks and even pop-ups with respect to a target, the intensity pattern of the video TV frames is changing dynamically, varying widely at relatively high speeds. Under these undesirable dynamic video conditions, it is almost impossible to generate enough threshold values to suit all the changing video conditions. For this reason, it appears that this type of updating processor is not suitable for the situations described above and more than likely track will be lost in those instances.

Another known processor for updating is one which updates the reference array periodically (i.e., the reference array is rederived automatically every W frames, W being arbitrary or preset). However, experimentation of these systems has demonstrated that, in some cases, each time the reference array is updated, a slight difference in the intensity pattern occurs, resulting in the Reference window walking through the video scene in the subsequent TV frames. This phenomenon is more commonly referred to as "random walk".

Still another known processor for updating is one which updates the reference array using a recursive update procedure. That is, each time a new reference array of pixels is acquired, a weighted average or integration is performed based on a past history of reference arrays to derive the updated reference array for use in cross-correlation of subsequent TV video frame information. Here again, in those cases in which the aspect angle of the image may be constantly changing as a result of aircraft maneuvering, for example, the averaged periodic updates of the reference array of pixels may generate a new image which is of some form other than the originally perceived target image portion. For example, if the originally acquired target image in the Reference window has the form of a rectangle and for some reason, this rectangular image undergoes a rotation with time due possibly to aircraft maneuvering, then the resultant averaged reference array image after a number of updates may resemble a circle or some other form closely associated therewith. This problem appears similar to the problem of the periodic updating processor. Consequently, it is likewise expected to cause a "random walk" phenomenon in some instances.

Apparently, a fundamental problem with the updating processors of the DACT's is to know when to automatically update the reference image or array of pixels. Updating the reference array is generally necessary when the perceived target or selected portion thereof within the Track window changes in size or aspect angle or when the intensity pattern or structure of the image is caused to change. The known updating processors described hereabove appear to be inadequate in all cases for use in video tracking because they require undesirable attentiveness, in some cases, in reacquiring a new reference image once track is lost. A more desirable reference image updating system may be one which can adaptively update the reference array of pixels in accordance with the actual dynamically changing video conditions so as to minimize attentiveness with regard to the operation of the DACT system.

SUMMARY OF THE INVENTION

In accordance with the present invention, an adaptive update reference threshold processor is embodied as part of an area correlation video tracker for adaptively updating the intensity pattern of a video tracking reference subarray of pixels based on changing video scene conditions of said video tracker. The area correlation video tracker includes an electro-optical sensor for generating frames of video information representative of an intensity pattern of the field of view of the electro-optical sensor corresponding to discrete intervals in time; means for partitioning a preselected portion of the generated video frames into an array of picture elements, the value of each picture element being representative of the gray level intensity corresponding to its index in the array, the array being additionally partitioned into a predetermined number of indexed subarray zones; means for acquiring the gray level value of the picture elements of a selected first subarray zone corresponding to an acquisition video frame; and a correlation means for cross-correlating, based on a predetermined metric correlation function, the gray level values of the picture elements of the selected first subarray zone with the gray level values of the partitioned subarray zones of each of a number of video frames generated subsequent the acquisition video frame to identify a second subarray zone of picture elements in each of the number of subsequently generated video frames and to derive a cross-correlation metric value associated with each of the identified second subarray zones.

The adaptive updating processor comprises a means operative to perform an autocorrelation of the gray level values of the picture elements of the selected first subarray with the gray level values of the picture elements of at least one predetermined third subarray zone of the acquisition video frame and to further perform an autocorrelation of the gray level values of the picture elements of the identified second subarray zone with the gray level values of the picture elements of at least one predetermined fourth subarray zone of the same video frame, both autocorrelation operations being performed in accordance with the predetermined metric correlation function to render a reference threshold correlation metric value derived from the video information of the acquisition frame and another threshold correlation metric value derived for each of the number of subsequently generated video frames from the corresponding video information thereof. The adaptive updating processor is further operative to render an update condition based on the results of a comparison between one derived cross-correlation metric value and the reference threshold correlation metric value, said update condition causing the gray level values of the picture elements of the selected first subarray to be replaced with the gray level values of the picture elements of the identified second subarray corresponding to the one cross-correlation metric value and causing the reference threshold correlation metric value to take on the value of the another threshold correlation metric value derived from the video frame corresponding to the one cross-correlation metric value. Thereafter, cross-correlation processing will be performed with the updated gray level values of the picture elements of the selected first subarray zone and updated reference threshold correlation metric value.

More specifically, the predetermined third and fourth subarray zones are located in their corresponding arrays in a predetermined indexed relationship to the selected first and identified second subarray zone, respectively. An autocorrelation metric value is derived from each of the autocorrelations performed with the video information of the acquisition frame and the maximum of these derived autocorrelation metric values is selected as the reference threshold correlation metric value. Furthermore, an autocorrelation metric value is additionally derived from each of the autocorrelations performed with the video information of a frame generated subsequent the acquisition frame and the maximum of these derived autocorrelation metric values is selected as the another threshold correlation metric value. And still further, the update condition is rendered for the one of the number of subsequently generated frames which has a derived cross-correlation metric value associated with the identified second subarray zone thereof that is substantially greater than the reference threshold correlation metric value.

DESCRIPTION OF THE PREFERRED EMBODIMENT

Figure 2:
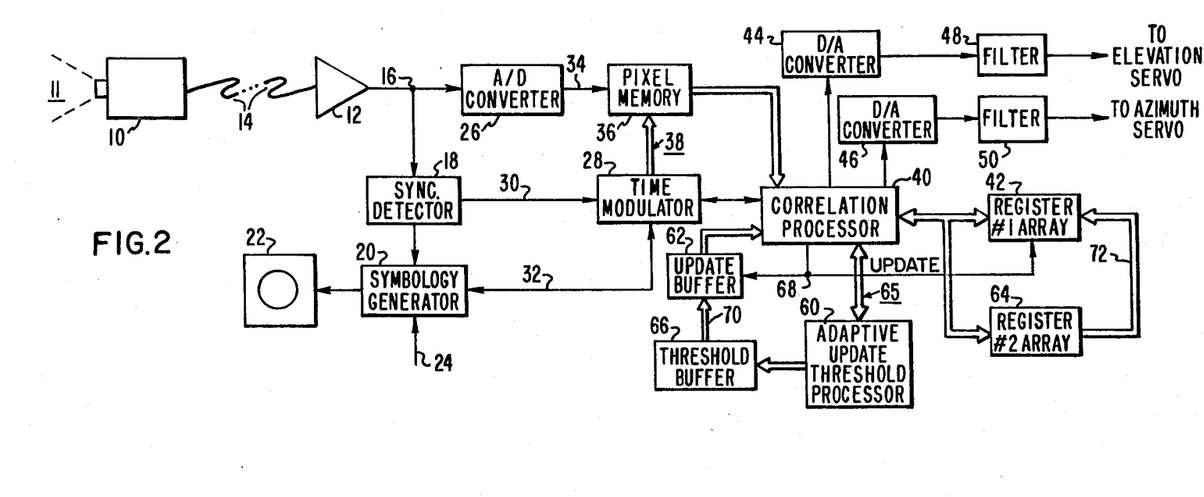
FIG. 2 is a schematic block diagram of an area correlation tracker suitable for embodying the broad principles of the present invention.

In the embodiment shown in the schematic block diagram of FIG. 2 which depicts an area correlation video tracker found suitable for embodying the broad principles of the present invention, an electro-optical sensor 10 such as a conventional TV camera, for example, generates frames of video information, each frame being representative of an intensity pattern of the field of view 11 of the electro-optical sensor 10 corresponding to an interval in time. Generally, each frame of video information is sequentially conducted to a video amplifier 12 over signal line 14 in a standardized 512 line TV frame format or 256 line even or odd field format usually at a frame rate of approximately 30 times a second. The output signal 16 of the video amplifier 12 is supplied to a sync detector 18 which typically identifies the beginning of each new frame in the sequence of frames. A conventional symbology generator 20 provides the cursor display identification marks for the Track and Reference windows 14' and 10', respectively, as shown in FIG. 1, prior to passing the video frame information to a display device 22 which may be a conventional TV monitor, for example. The Track and Reference window cursors within the display area of the TV monitor 22 may be conventionally positioned during an acquisition frame of video information by an operator using an operator input command signal 24, the functioning of which is well known to those skilled in the pertinent art and in no way forms any part of the present invention.

A conventional video signal digitizer 26 more commonly referred to as an analog-to-digital (A/D) converter is disposed in the video tracker to partition each video frame or field of video information conducted over signal line 16 into time indexed digitized picture elements (pixels). Generally, a time modulator 28 is governed by both a sync signal 30 identifying the start of each generated video frame and a time marker signal 32 which provides timing information to select an array of picture elements which correspond to the time indexed position of the Track window in each video frame. The selected array of digitized picture elements sequentially conducted over signal line 34 may be addressably stored in a conventional pixel memory 36 in digital registers designated by the control signals 38 issued from the time modulator 28. Each digital word stored in the pixel memory 36 represents the quantized level intensity corresponding to its location in the selected array for the generated video frames.

A known digital correlation processor 40 functions in a well known manner in cooperation with the contents of the pixel memory 36 and time modulator 28 to perform correlations of indexed subarray zones partitioned from the array of picture elements stored in the pixel memory 36. These correlations are generally performed in accordance with some predetermined metric function to derive tracking errors which govern the sensors (not shown) to position the TV camera 10 to maintain a selected target or portion thereof in the field of view 11. Usually, the partitioned subarray zones of the array are sized in conjunction with the predetermined area of the Reference window. For example, if the Track window encompasses an area in each video frame display designated by an array of 32×32 picture elements, which sets the size of the pixel memory 36, and the Reference window encompasses an area in each video frame display designated by an array of 16×16 picture elements, then the selected 32×32 array of picture elements may be subdivided or partitioned into possibly 289 subarray zones with each zone sized in relation to the Reference window.

In operation, the time indexed position of the Reference window subarray zone of picture elements during an acquisition video frame is provided to the time modulator 28. The correlation processor 40 in cooperation with the time modulator 28 reads from the pixel memory 36 the subarray of digital words corresponding to the Reference window picture elements at acquistion and generally stores them in a register array such as in the block shown at 42, for example. In a video frame generated subsequent the acquisition video frame, the gray level values of the picture elements of the subarray zone stored at 42 are cross-correlated with the gray level values of the corresponding picture elements of the positioned subarray zones of the selected array of picture elements for each of a number of the subsequently generated video frames. A new location for the Reference window within the Track window as exhibited in the subsequent display 1b in FIG. 1 may result from the cross-correlation operation of the processor 40. The correlator 40 is then capable of digitally computing servo tracking errors, generally related to azimuth and elevation, from the differences in the location of Reference window between the location at the acquisition video frame 1a and the location at a subsequent video frame 1b, both of FIG. 1. These tracking errors are typically applied, at times, to the gimbal servos (not shown) through a pair of D/A converters 44 and 46 and a pair of filtering circuits 48 and 50 which are respectively cascaded therewith to control the positioning of the TV camera 10.

More specifically, the correlation processor 40 found suitable for the present embodiment employs an image matching correlation function to process the partitioned subarray zone of the selected Track window array to identify the position of the Reference window in the Track window of generated video frames subsequent the acquisition frame. Accordingly, the Reference window subarray acquired from the acquisition video frame may be represented by an N dimensional vector r wherein the gray level value of the picture element indexed by i in the reference subarray is denoted by $r_i$. Likewise, the subarrays partitioned from the Track window array may be denoted as $Z_k$ where k is the position index of the area of the subarray Z in the overall array area and each subarray zone may be represented by another vector p ($Z_k$) having a dimension N. The gray level value of the picture elements indexed correspondingly by i in each of the subarray zones Z, may be denoted as $p_i(Z_k)$. An image match cross-correlation or autocorrelation value $d_k$ may be derived for each subarray in a same or subsequently generated video frame in accordance with the following expression:

$$d_k = \sum_{i=1}^{n} |r_i - p_i(z_k)| \quad (1')$$

A best match is generally defined as the minimum cross-correlation value $d_n$ where $$d_n = \min_k d_k. \quad (2')$$

As was disclosed in detail in the Background section, a fundamental problem with area correlation video tracking is to know when to update the intensity pattern of the reference subarray of picture elements selected from the acquisition frame during subsequent cross-correlation processing. The instant embodiment provides for an adaptive update mechanization to determine the video frame during which the intensity pattern of the reference subarray should be updated. In theory, the correlation processor 40 identifies the location of the reference subarray zone in frames subsequent the acquisition frame to the nearest picture element since the picture element subarrays of the pixel memory 36 are quantized with regard to the time indexed picture elements. That is, the error in location of the reference subarray zone in subsequent frames in accordance with the image matching cross-correlation processing is less than or equal to half of a picture element index dimension of the Track window display.

Figure 3:
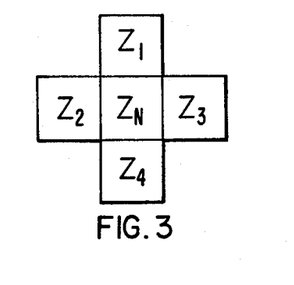
FIG. 3 depicts an example of a preselected indexed relationship of a predetermined number of subarray zones of picture elements $Z_1$, $Z_2$, $Z_3$ and $Z_4$ to a selected or identified subarray zone of picture elements $Z_N$ which is suitable for describing the principles of the present invention.

It is well understood by those skilled in the pertinent art that the correlation processor 40 of the type described hereinabove or one similar thereto may also be capable of carrying out autocorrelation processing of the reference subarray with other selected or predetermined subarrays within the Track window of the same video frame using a similar image matching metric function as that described in connection with equations (1') and (2') supra. As an example, suppose that four subarray zones $Z_1$, $Z_2$, $Z_3$ and $Z_4$ are predetermined in coordinate indexed relationship to the identified reference subarray zone $Z_n$ as shown in FIG. 3. Let the autocorrelation values associated with the autocorrelation image matching processing be denoted as $\phi_{mn}$ and likewise, let the cross-correlation values be denoted as $\psi_{mn}$. In terms of the time indexed raster scan coordinates of a typical TV display, the $\phi_{mn}$ values respectively corresponding to the predetermined subarray zones $Z_1$, $Z_2$, $Z_n$, $Z_3$ and $Z_4$ may be denoted as $\phi_{-1,0}$; $\phi_{0,-1}$; $\phi_{0,0}$; $\phi_{0,1}$; and $\phi_{1,0}$ where, for example, $\phi_{1,0}$ corresponds to the subarray zone location in the Track window which corresponds to one picture element downward and on the same vertical axis with respect to the identified position (0,0) of the identified reference subarray location. The subarray location corresponding to the "best match" cross-correlation image match value $d_n$ is denoted in cartesian coordinates by (0,0) and the cross-correlation value is denoted $\psi_{0,0}$. For subelement displacements $\Delta x$ and $\Delta y$ with respect to the best match subarray zone location, the "best match" cross-correlation value, $\psi_{0,0}$, may be approximated as:

$$\psi_{0,0} \approx |\Delta x|\phi_{0,n} + |\Delta y|\phi_{m,0}; \quad (3')$$

where m and n are defined as:

$$\left.\begin{array}{l} n = \text{sign}(\Delta x) \text{ and} \\ m = \text{sign}(\Delta y) \end{array}\right\} \quad (4')$$

Theoretically, the largest error in the location of the reference subarray zone in subsequent video frames generally occur when $$|\Delta x| = |\Delta y| = \tfrac{1}{2} \quad (5')$$

As a result of this assumption, it can be shown that:

$$\psi_{0,0} \leq \max(\phi_{0,1}; \phi_{0,-1}; \phi_{1,0}; \phi_{-1,0}) = \phi_{max} \quad (6')$$

and with equality occurring if $$\max(\phi_{0,1}; \phi_{0,-1}) = \max(\phi_{1,0}; \phi_{-1,0}).$$

Therefore, it logically follows that an adaptive update may be normally achieved at times that:

$$\psi_{0,0} > \phi_{max}, \quad (7')$$

which assures that an update will not occur for subelement displacements.

In accordance with the broad principles of the present invention, an adaptive update reference threshold processor shown in FIG. 2 at 60 is disposed within the area correlation video tracker and cooperatively functions with the correlation processor 40 to adaptively update the reference threshold value denoted as $\phi_{max}$, and to additionally update the intensity pattern of the picture elements of the reference subarray for subsequent cross-correlation processing. An example of operation may involve the acquisition of a reference subarray from the track window array in the pixel memory 36 corresponding to an acquisition video frame in accordance with the operation of the correlation processor 40. The intensity pattern of the picture element of the reference subarray zone $Z_n$ of the acquisition frame may be stored in the register array at 42. An image matching autocorrelation process similar to that described above may be carried out in the correlation processor 40 between the contents of the register array 42 and the picture elements of predetermined subarray zones of the acquisition video frames located with respect to the reference subarray zone $Z_n$ in positions similar to that shown in FIG. 3. If it is assumed that the picture element cartesian coordinates of the selected reference subarray in the track window of the acquisition frame are $X_N$, $Y_M$ with respect to a prespecified origin in each video frame, then the coordinates of the other subarray zones predetermined for autocorrelation may be denoted as depicted in the Table to follow:

| Subarray Zone | Matrix Location | |
|---|---|---|
| | X | Y |
| $Z_1$ | $X_N$ | $M-1$ |
| $Z_2$ | $X_{N-1}$ | $Y_M$ |
| $Z_3$ | $X_{N+1}$ | $Y_M$ |

| Subarray Zone | Matrix Location X | Y |
|---|---|---|
| $Z_4$ | $X_N$ | $Y_{M+1}$ |

Autocorrelation values $\phi_1$, $\phi_2$, $\phi_3$ and $\phi_4$ are derived by image matching the picture elements of the reference subarray zone $Z_n$ respectively with the corresponding picture elements of the predetermined zones like $Z_1$, $Z_2$, $Z_3$ and $Z_4$ geometrically located with respect to the Zone $Z_n$. The reference threshold value for the acquisition frame is derived as the maximum of the derived autocorrelation values such as $\phi_1$, $\phi_2$, $\phi_3$ and $\phi_4$ or $\phi_{max}$. The value of $\phi_{max}$ is stored in an update register shown at 62 in FIG. 2.

In video frames generated subsequent the acquisition frame the location of the reference subarray zone $Z_n'$ is identified from the best match cross-correlation of contents of the register array 42 with the picture elements of the partitioned subarray zones of the track window stored in the pixel memory 36. The intensity pattern of the picture elements of the identified subarray $Z_n'$ may be temporarily stored in a register array shown at 64 in FIG. 2. The picture element cartesian coordinates $X_N$, $Y_M$ of the identified subarray $Z_n'$ are provided to the adaptive update threshold processor 60 over signal lines 65. With respect to the identified subarray coordinates $X_N$, $Y_M$, the coordinates of the subarray zones $Z_1$ through $Z_4$, for example, may be predetermined in accordance with that set forth in the Table found hereinabove. An autocorrelation is performed in the correlation processor 40 between the contents of the register array 64 and the picture elements of each of the partitioned subarray zones of the track window and the autocorrelation values $\phi mn$ resulting therefrom are provided to the adaptive update threshold processor 60 over signal lines 65. The threshold processor 60 segregates the values $\phi_1$ through $\phi_4$ from the autocorrelation values provided thereto based on a prespecified indexed relationship of the zones $Z_1$ through $Z_4$ with respect to the index of the identified subarray zone $Z_{N'}$ and selects therefrom a maximum value $\phi_m'$ which it stores in a threshold buffer register 66. The correlation processor 40 compares the cross-correlation value $\psi_{0,0}$ derived for each of the subsequently generated video frames with the contents of the update buffer register 62 which is $\phi_m$.

In a subsequently generated video frame which is determined to have a cross-correlation value $\psi_{0,0}$ that is substantially greater than the value of $\phi_m$ stored in the update buffer register 62, an update signal 68 is generated by the correlation processor 40 to enable the update buffer register 62 to take on the value of the contents of the threshold buffer register 66 provided thereto over signal line 70. Thus, the value of $\phi_m$ is adaptively updated to the value of $\phi_m'$ upon generation of the update signal 68. In addition, the update signal 68 governs the updating of the register array 42 with the corresponding values of the picture elements of the subarray contained in register array 64 provided thereto over signal lines 72. The updated contents of register array 42 may thereafter be used for cross-correlation manipulations of the correlation processor 40 with video information of frames subsequent the update frame and the updated reference threshold stored in update buffer register 62 may be used in the comparisons performed by the correlation processor 40 to determined the next update video frame.

Figure 4:
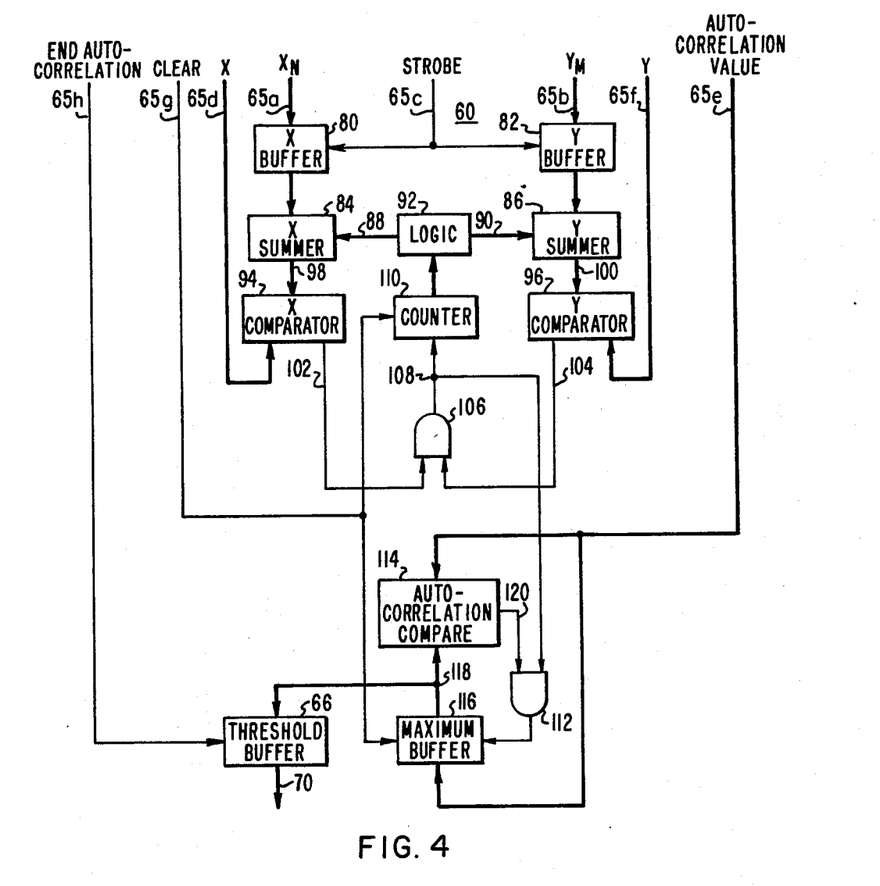
FIG. 4 is a more detailed schematic block diagram of an adaptive update threshold processor suitable for use in the embodiment shown in FIG. 2.

A more detailed schematic of an adaptive update threshold processor 60 found suitable for use in the present embodiment is shown in FIG. 4. The picture element coordinates $X_N$ and $Y_M$ of the best match subarray identified in video frames subsequent the acquisition frame are provided to the adaptive update processor 60 from the correlation processor 40 over signal lines 65a and 65b, respectively. A strobe signal 65c is additionally provided to the processor 60 to gate the best match coordinate information $X_N$, $Y_M$ into an X buffer register 80 and a Y buffer register 82, respectively, at appropriate times generally subsequent the cross-correlation processing of the track window video information of the generated frames. The outputs of the X and Y buffers 80 and 82 are input to an X summer 84 and a Y summer 86, respectively. Signals 88 and 90 are respectively provided to a second input of the X summer 84 and the Y summer 86 from a logic circuit 92. An X comparator 94 and Y comparator 96 are additionally disposed within the processor 60. One input of the comparator 94 is the resultant signal 98 of the summer 84 and another input is a signal 65d which is representative of the X raster scan time indexed coordinate address corresponding to the subarray autocorrelation value being presented concurrently therewith to the processor 60 over signal line 65e. Likewise, one input of the comparator 96 is the resultant signal 100 of the summer 86 and another input is a signal 65f which is representative of the Y raster scan time indexed coordinate address corresponding to the subarray autocorrelation value being presented concurrently therewith to the processor 60 over signal line 65e. Equivalence signals 102 and 104 generated by the comparators 94 and 96 are coupled to each input of an AND gate function 106 which has an output signal 108 coupled to the clock input of a counter 110. The output of the counter 110 is used to govern the logic circuits 92. The signal 108 is additionally coupled to one input of another AND gate function 112. An autocorrelation value comparator 114 and a maximum autocorrelation storage register buffer 116 are also disposed within the processor 60. The signal line 65e is provided to one input of the comparator 114 and the input of the register 116. The output 118 of the register 116 is supplied to the other input of the comparator 114 and to the input of the threshold storage register buffer 66. A greater than signal 120 generated by the comparator 114 is coupled to the other input of the AND gate function 112, the output signal 122 of which is coupled to the gate input of the buffer register 116. A clear signal 65g and an end of autocorrelation signal 65h both generated by the processor 40 are respectively supplied to the clear inputs of the counter 110 and the buffer register 116; and to the gate input of the threshold buffer 66.

The digital elements of the embodiment shown in FIG. 4 are comprised of well-known digital components: for example, the buffer storage registers 80, 82, 116 and 66 may be comprised of medium scale integrated (MSI) circuit chips commonly referred to in the trade as quad latches; the summers 84 and 86 may be of the full adder type using one or more known cascaded MSI circuit chips; and the digital comparators 94, 96 and 114 may all be comprised of one or more known MSI comparator circuits having at least an equivalence output, comparator 114 including a greater than output 120. An assembly of these known digital components in accordance with the embodiment depicted in FIG. 4 is considered obvious to one of average skill in the pertinent art and is in no way considered as part of the present invention. The counter 110 and logic circuit 92 which may be comprised of a number of logical gates configure combinatorially in accordance with some predetermined function to provide signals over lines 88 and 90 corresponding to the status of the output of the counter 110. In one case, the counter 110 may be a 2-bit counter having the possible states of 0,0; 0,1; 1,0; and 1,1 wherein the logic circuit 92 may translate these states of the counter 110 by the predetermined combinational logic programmed therein into cartesian coordinate values $X_T$, representative of the value over signal line 88, and $Y_T$, representative of the value over signal line 90. These values $X_T$ and $Y_T$ are summed with the value of $X_N$ and $Y_M$ stored in the buffers 80 and 82, respectively to yield sequentially the positions of a number of predetermined subarrays like the ones $Z_1$, $Z_2$, $Z_3$ and $Z_4$ described hereabove. To this extent, the programming of the logic circuit 92 with respect to the logic states of the counter 110 may best be defined in accordance with the following table:

| COUNTER 110 OUTPUT | $X_T(88)$ | $Y_T(90)$ |
| --- | --- | --- |
| 00 | 0 | −1 |
| 10 | −1 | 0 |
| 01 | +1 | 0 |
| 11 | 0 | +1 |

The translated values of $X_T$ and $Y_T$ when summed with the time indexed position coordinates $X_N$, $Y_M$ of the best match identified subarray zone resulting from the cross-correlation processing provide the coordinate values of the time indexed positions of the subarray zones $Z_1$ through $Z_4$ in their respective sequential raster scan positions as shown in FIG. 3. The denoted values of +1 and −1 in the above table refer to subarray zones which are positioned 1 picture element above or below, respectively, or 1 picture element to the left or right, respectively, in relation to the position $X_N$, $Y_M$ of the identified subarray zone $Z_N$.

In the operation of extracting the maximum autocorrelation value for each of a number of generated video frames, the embodiment of FIG. 4 is initiated by a signal over the strobe line 65c from the correlator 40 to gate the values of the coordinates $X_N$ and $Y_M$ corresponding to the best match cross-correlation subarray zone in the buffers 80 and 82, respectively. During the subsequent autocorrelation process conducted by the correlator 40, the state of the counter 110, which may be a 2-bit counter, is translated into values of $X_T$ and $Y_T$ by the logic circuit 92 conducted over signal lines 88 and 90 to the summers 84 and 86, respectively. The output of the summers 84 and 86 yield the time indexed raster scan positions of the predetermined subarrays $Z_1$ through $Z_4$, for example. Initially, the counter 110 and buffer register 116 are cleared by the signal 65g. This results in the outputs of the summers 84 and 86 yielding a subarray time indexed coordinate position of $X_N$, $Y_{M-1}$ corresponding to subarray zone $Z_1$.

The X and Y comparators 94 and 96, respectively, determine when the autocorrelation process is conducted on the subarray denoted by $Z_1$ by establishing concurrent equivalence between both pairs of signals 98 and 65d; and 100 and 65f. During a concurrent equivalence event, the output signal 108 of AND gate 106 gates the autocorrelation value existing on signal line 65e into the maximum buffer register 116 if signal 120 is true. In order for signal line 120 to be true, the comparator 114 detects that the present signal over 65e is greater than the signal captured in the buffer register 116. Since the buffer register 116 is initially cleared and $Z_1$ is the first in sequence of the predetermined subarray zones to be autocorrelated, the signal 120 is true and the first autocorrelation value corresponding to the subarray $Z_1$ in the sequence is gated for storage in the buffer register 116. The signal 108 generated by the AND gate 106 during this concurrent equivalence additionally increments the counter 110 to its next consecutive logical state 1,0 which causes the output of the summers 84 and 86 to yield respectively the address of the subarray zone $Z_2$ which is $X_{N-1}$, $Y_M$. A concurrent equivalence is determined by AND gate 106 as the autocorrelation value corresponding to the subarray zone $Z_2$ is conducted over signal 65e. Should the $Z_2$ autocorrelation value be greater than the $Z_1$ autocorrelation value, then the signal 120 is true and the $Z_2$ autocorrelation value is gated into buffer register 116; otherwise, the $Z_1$ autocorrelation value remains stored in register 116.

The above-described operation pertaining to the update processor 60 is sequentially repeated for the other of the predetermined subarray zones like $Z_3$ and $Z_4$, for example, and the maximum value of the corresponding autocorrelation value is always gated into the buffer register 116. At the end of the autocorrelation process of the partitioned subarrays associated with a video frame, a signal is provided from the correlator 40 over signal line 65h to update the threshold buffer register 66 with the maximum of the autocorrelation values of the predetermined subarray zones which is stored in buffer register 116. If it is determined during the comparison carried out by the correlator 40 that the cross-correlation value $\psi_{0,0}$ of the best match subarray zone $Z_N$ of the present video frame is greater than the reference threshold value stored in the update register buffer 62 (see FIG. 2), then the newly derived threshold value or maximum autocorrelation value which is stored in buffer register 66 is gated into the update buffer register 62 over signal line 70 to become the updated reference threshold value in buffer register 62 for update comparisons of the best match cross-correlation values derived from subsequent video frames. Generally, however, the comparison performed by the correlator 40 does not result in the generation of an update signal over signal line 68 and the reference threshold value which is the contents of the buffer register 62 is not updated. Accordingly, the above described operation of the update processor 60 is repeated for each of a number of subsequently generated video frames to derive a maximum autocorrelation value for each video frame which is temporarily stored in the buffer register 66. Only during those video frames in which an update signal 68 is generated are the contents of the buffer register 66 transferred to the update buffer register 62 causing an adaptive update of the reference threshold value to occur.

It is understood that while the adaptive update threshold processor 60 has been described in connection with a sequentially operated embodiment as shown in FIG. 4 as directed towards its cooperative functional relationship with the correlation processor 40, one of a random access type operation may similarly be used as well to perform an adaptive update process without deviating from applicants' inventive principles. Therefore, it is not applicants' intention to have their invention construed as being limited to any one embodiment, but rather it is their desire to define their invention within the scope and breadth of the claims to follow.

We claim:

1. In an area correlation video tracker including an electro-optical sensor which generates frames of video information representative of an intensity pattern of the field of view of said electro-optical sensor corresponding to discrete intervals in time; means for partitioning a preselected portion of said generated video frames into an array of picture elements, the value of each picture element being representative of the gray level intensity corresponding to its index in said array, said array being additionally partitioned into a predetermined number of indexed subarray zones; means for acquiring the gray level values of the picture element of a selected first subarray zone corresponding to an acquisition video frame; and correlation means for cross-correlating, based on a predetermined metric correlation function, the gray level values of the picture elements of said selected first subarray zone with the picture element gray level values of said partitioned subarray zones of each of a number of video frames generated subsequent said acquisition video frame to identify a second subarray zone of picture elements in each of said number of subsequently generated video frames and to derive a cross-correlation metric value associated with each of said identified second subarray zones, the improvement of an adaptive updating means comprising:

means operative to perform an autocorrelation of the gray level values of the picture elements of said selected first subarray zone with the gray level value of the picture elements of an at least one predetermined third subarray zone of said acquisition video frame in accordance with said predetermined metric correlation function to derive a reference threshold correlation metric value and to further perform an autocorrelation of the gray level values of the picture elements of said identified second subarray zone with the gray level values of the picture elements of at least one predetermined fourth subarray zone of the same video frame in accordance with said predetermined metric correlation function to derive another threshold correlation metric value, said another threshold correlation metric value being derived for each of said number of subsequently generated video frames;

means operative to render an update condition based on the results of a comparison between one derived cross-correlation metric value and said reference threshold correlation metric value, said update condition causes the gray level values of the picture elements of said selected first subarray to be replaced with the gray level values of the picture elements of said identified second subarray corresponding to said one cross-correlation metric value and causes said reference threshold correlation metric value to take on the value of said another threshold correlation metric value derived from the video frame corresponding to said one cross-correlation metric value, whereby subsequent cross-correlation processing will be performed with the updated gray level values of the picture elements of the selected first subarray and updated threshold correlation metric value.

2. The adaptive updating means in accordance with claim 1 wherein the at least one predetermined third subarray zone of picture elements is located in the array in a predetermined indexed relation to the selected first subarray zone; and wherein the at least one predetermined fourth subarray zone of picture elements is located in the array in a similar predetermined indexed relationship to the identified second subarray zone for each of the number of subsequently generated video frames.

3. The adaptive updating means in accordance with claim 1 wherein an autocorrelation metric value is derived from each of the autocorrelations performed between the gray level values of the picture elements of the selected first subarray zone and the gray level values of the picture elements of each of the at least one predetermined third subarray zone(s); and wherein the maximum of said derived autocorrelation metric value(s) is selected as the reference threshold correlation metric value.

4. The adaptive updating means in accordance with claim 1 wherein an autocorrelation metric value is derived from each of the autocorrelations performed for each of the number of subsequently generated video frames between the gray level values of the picture elements of the identified second subarray zone and the gray level values of the picture elements of each of the at least one predetermined fourth subarray zone(s); and wherein the maximum of said autocorrelation metric value(s) derived for each of the number of subsequently generated video frames is selected as the another threshold correlation metric value for each of the number of subsequently generated video frames.

5. The adaptive updating means in accordance with claim 1 wherein the update condition is rendered for the one of the number of subsequently generated video frames which has a derived cross-correlation metric value associated with the identified second subarray thereof that is substantially greater than the reference threshold correlation metric value.

6. The adaptive updating means in accordance with claim 1 wherein the predetermined metric correlation function is one of image matching the picture elements of two subarrays being represented by two vectors r and p, each having a dimension of n; and wherein a correlation metric valued may be derived in accordance with the following expression:

$$d = \sum_{i=1}^{n} |r_i - p_i|,$$

where $r_i$ is the gray level value of the ith picture element of the subarray represented by the vector r and $p_i$ is the gray level value of the corresponding ith picture element of the other subarray represented by the vector p.

7. The adaptive updating means in accordance with claim 6 wherein an image matching cross-correlation is performed between the gray level values of the picture elements $r_i$ of the selected first subarray zone and the gray level values of the corresponding picture elements $p_i(Z_k)$ of each k of the partitioned subarray zones $Z_k$ of a video frame generated subsequent the acquisition of video frame to derive a cross-correlation value $d_k$ for each zone $Z_k$ thereof in accordance with the following expression:

$$d_k = \sum_{i=1}^{n} |r_i - p_i(z_k)|;$$

wherein the identified second subarray zone is the subarray zone which corresponds to the minimum $d_r$ of the cross-correlation values $d_k$ which may be mathematically expressed as:

$$d_n = \min_k d_k; \text{ and}$$

wherein $d_n$ is the cross-correlation metric value which is derived for each one of the number of subsequently generated video frames and compared with the reference threshold correlation metric value to establish the subsequent video frame during which an update is performed.

8. The adaptive updating means in accordance with claim 6 wherein an image matching autocorrelation is performed between the gray level values of the picture elements $r_i$ of the selected first subarray zone and the gray level values of the corresponding picture elements $p_i(z_k)$ of each k of the at least one predetermined third subarray zone(s) $z_k$ of the acquisition video frame to derive an autocorrelation value $d_k$ for each predetermined third subarray zone $z_k$ in accordance with the following expression:

$$d_k = \sum_{i=1}^{n} |r_i - p_i(z_k)|;$$

wherein the maximum $d_n$ of the autocorrelation values $d_k$, which may be expressed mathematically as:

$$d_n = \max_k d_k$$

is the reference threshold correlation metric value for the acquisition video frame.

9. The adaptive updating means in accordance with claim 6 wherein an image matching autocorrelation is performed between the gray level values of the picture elements $r_i$ of the identified second subarray zone and the gray level values of the corresponding picture elements $p_i(z_k)$ of each k of the at least one predetermined fourth subarray zone to derive an autocorrelation value $d_k$ for each predetermined fourth subarray zone $z_k$ in accordance with the following expression:

$$d_k = \sum_{i=1}^{n} |r_i - p_i(z_k)|;$$

wherein the maximum $d_n$ of the autocorrelation values $d_k$ which may be expressed mathematically as:

$$d_n = \max_k d_k,$$

is the another threshold correlation metric value derived for each of the number of subsequently generated video frames.

10. In an area correlation video tracker including an electro-optical sensor which generates frames of video information representative of an intensity pattern of the field of view of said electro-optical sensor corresponding to discrete intervals in time; means for partitioning a preselected portion of said generated video frames into an array of picture elements, the value of each picture element being representative of the gray level intensity corresponding to its index in said array, said array additionally being partitioned into a predetermined number of indexed subarray zones; means for acquiring the gray level values of the picture elements of a selected first subarray zone corresponding to an acquisition video frame; and correlation means for cross-correlating, based on a predetermined metric correlation function, the gray level values of the picture elements of said selected first subarray zone with the picture element gray level values of said additional subarray zones of each of a number of video frames generated subsequent said acquisition video frame to identify a second subarray zone of picture elements in each of said number of subsequently generated video frames and to derive a cross-correlation metric value associated with each of said identified second subarray zones, the improvement of an adaptive updating means comprising:

means operative to perform autocorrelations in accordance with a predetermined metric function between (a) the gray level values of the picture elements of said selected first subarray zone and the gray levels of corresponding picture elements of said predetermined subarray zones in said preselected array of said acquisition frame to derive an autocorrelation metric value for each autocorrelation, and between (b) the gray level values of the picture elements of said identified second subarray zone and the gray level values of corresponding picture elements of said predetermined subarray zones in said preselected array of a video frame generated subsequent said acquisition frame to derive an autocorrelation metric value for each autocorrelation, whereby a group of autocorrelation metric values is derived for each of said number of subsequently generated frames corresponding to the subarray video information generated in each of said number of frames;

means for segregating from the autocorrelation metric values derived from said acquisition video frame an initial set of autocorrelation metric values based on a first predetermined relationship between the indexes of the autocorrelated subarray zones and the index of said selected first subarray zone in the preselected array of said acquisition frame, and for selecting one autocorrelation metric value from said segregated initial set to be a reference threshold correlation metric value; and for segregating from each of said groups of autocorrelation metric values correspondingly derived from the video information of each of said number of subsequently generated frames another set of autocorrelation metric values based on a second predetermined relationship between the index of said identified second subarray zone and the indexes of the autocorrelated subarray zones corresponding to the video frame from which said second subarray was identified, and for selecting one autocorrelation metric value from each of said another sets to each be an another threshold correlation metric value; and means for generating an update signal corresponding to the one of said number of subsequently generated video frames which has a derived cross-correlation metric value substantially greater than said reference threshold correlation metric value, said update signal causing the gray level values of the picture elements of said selected first subarray zone to be replaced with the gray level values of the picture elements of said second subarray zone identified from said one subsequently operated video frame and causes said reference threshold correlation value to take on the value of said selected another threshold correlation metric value corresponding to said one subsequently generated video frame, whereby subsequent cross-correlation processing will be performed with the updated gray level values of said first subarray zone and the updated threshold correlation metric value.

11. An adaptive updating means in accordance with claim 10 wherein the index of the selected first subarray zone in the preselected array of picture elements of the acquisition frame is denoted by the cartesian coordinates $X_N$, $Y_M$, where N and M are integer number of picture elements along an X-axis and Y-axis, respectively, both measured with respect to a prespecified origin of the generated video frames; and wherein the first predetermined relationship of the subarray zone indexes corresponding to the segregated initial set of autocorrelation metric values is expressed in cartesian coordinates with respect to the index $X_N$, $Y_M$ of the selected first subarray zone as follows: $X_N$, $X_{M-1}$, $X_{N+1}$, $Y_M$; $X_{N-1}$, $Y_M$; and $X_N$, $Y_{M+1}$.

12. An adaptive updating means in accordance with claim 11 wherein the identified second subarray zone for each of the number of subsequently generated frames is similarly indexed in cartesian coordinates $X_N$, $Y_M$ as that of the selected first subarray zone; and wherein the second predetermined relationship of the subarray zone indexes corresponding to the segregated another set of autocorrelation metric values for each of the number of subsequently generated frames is expressed in cartesian coordinates with respct to the index of the identified second subarray zone as follows: $X_N$, $Y_{M-1}$; $X_{N+1}$, $Y_M$; $X_{N-1}$, $Y_M$; and $X_N$, $Y_{M+1}$.

13. The adaptive updating means in accordance with claim 10 wherein the predetermined metric correlation function is one of image matching the picture elements of two subarrays being represented by two vectors r and p, each having a dimension of n; and wherein a correlation metric valued may be derived in accordance with the following expression:

$$d = \sum_{i=1}^{n} |r_i - p_i|,$$

where $r_i$ is the gray level value of the ith picture element of the subarray represented by the vector r and $p_i$ is the gray level value of the corresponding ith picture element of the other subarray represented by the vector p.

14. The adaptive updating means in accordance with claim 13 wherein an image matching cross-correlation is performed between the gray level values of the picture elements $r_i$ of the selected first subarray zone and the gray level values of the corresponding picture elements $p_i(Z_k)$ of each one k of the partitioned subarray zones $Z_k$ of a video frame generated subsequent the acquisition video frame to derive a cross-correlation value $d_k$ for each zone $Z_k$ thereof in accordance with the following expression:

$$d_k = \sum_{i=1}^{n} |r_i - p_i(Z_k)|;$$

wherein the identified second subarray zone is the subarray zone which corresponds to the minimum $d_n$ of the cross-correlation values $d_k$ which may be mathematically expressed as:

$$d_n = \min_k d_k; \text{ and}$$

wherein $d_n$ is the cross-correlation metric value which is derived for each of the number of subsequently generated video frames and compared with the reference threshold correlation metric value to establish the subsequent video frame during which an update is performed.

15. The adaptive updating means in accordance with claim 13 wherein an image matching autocorrelation is performed between the gray level values of the picture element $r_i$ of the selected first subarray zone and the gray level values of the corresponding picture element $p_i(Z_k)$ of each one k of the partitioned subarray zones $Z_k$ of the acquisition video frame to derive an autocorrelation metric value $d_k$ for each corresponding subarray zone $Z_k$ in accordance with the following expression:

$$d_k = \sum_{i=1}^{n} |r_i - p_i(Z_k)|; \text{ and}$$

wherein the maximum $d_k$ of the segregated initial set of autocorrelation values is the one selected as the reference threshold correlation metric value for the acquisition video frame.

16. The adaptive updating means in accordance with claim 13 wherein an image matching autocorrelation is performed between the gray level values of the picture elements $r_i$ of the identified second subarray zone and the gray level values of the corresponding picture elements $p_i(Z_k)$ of each one k of the partitioned subarray zones $Z(k)$ for each of the number of subsequently generated video frames to derive an autocorrelation metric value $d_k$ for each corresponding subarray zone $Z_k$ in accordance with the following expression:

$$d_k = \sum_{i=1}^{n} |r_i - p_i(Z_k)|; \text{ and}$$

wherein the maximum $d_k$ from each of the segregated another set of autocorrelation metric values is the one selected as the another threshold correlation metric value associated with each of the number of subsequently generated video frames.

* * * * *